US007111242B1

(12) United States Patent
Grooters

(10) Patent No.: US 7,111,242 B1
(45) Date of Patent: Sep. 19, 2006

(54) METHOD AND APPARATUS FOR AUTOMATICALLY GENERATING A DEVICE USER INTERFACE

(75) Inventor: Brandon A. Grooters, Bedford, TX (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/238,375

(22) Filed: Jan. 27, 1999

(51) Int. Cl.
*G06F 3/00* (2006.01)
(52) U.S. Cl. ............... 715/744; 715/733; 715/716; 715/738
(58) Field of Classification Search ........ 345/327, 345/326, 339, 700, 733, 716–722, 740, 764; 715/700, 716–722, 733–747, 760, 764, 961, 715/968, 969
See application file for complete search history.

(56) References Cited

U.S. PATENT DOCUMENTS

| | | | | |
|---|---|---|---|---|
| 5,086,385 A | * | 2/1992 | Launey et al. ............ | 700/83 |
| 5,956,025 A | * | 9/1999 | Goulden et al. .......... | 345/327 |
| 5,990,884 A | * | 11/1999 | Douma et al. ............ | 345/327 |
| 6,020,881 A | * | 2/2000 | Naughton et al. ........ | 345/327 |
| 6,288,716 B1 | * | 9/2001 | Humpleman et al. ..... | 345/733 |
| 6,317,143 B1 | * | 11/2001 | Wugofski ................. | 715/765 |
| 6,546,419 B1 | * | 4/2003 | Humpleman et al. ..... | 709/223 |

FOREIGN PATENT DOCUMENTS

EP         0 875 837 A2    4/1998

\* cited by examiner

*Primary Examiner*—Sy D. Luu
(74) *Attorney, Agent, or Firm*—Jeffrey M. Anderson; Suiter West Swantz PC LLo

(57) ABSTRACT

A system and a method generate a device user interface executable by an information handling system. A device database includes a list of devices for which user interface components are available to implement functions for controlling the devices, and a resource database includes the user interface components. The device to be controlled by the user interface is identified and compared to a database of devices for which user interface resource components are available. A user interface generator determines whether the device is included in the device database and retrieves the user interface components from the resource database. A layout manager assembles the user interface components into a user interface. If the device is not listed, generic device user interface components are retrieved, otherwise device specific user interface components are retrieved, and assembled into a layout matrix. The user interface is created from the layout matrix.

20 Claims, 4 Drawing Sheets

METHOD AND APPARATUS FOR AUTOMATICALLY GENERATING A DEVICE USER INTERFACE

FIELD OF THE INVENTION

The present invention generally relates to the field of information handling systems, and particularly to a user interface for an information handling system.

BACKGROUND OF THE INVENTION

Information handling systems are increasingly utilized as a central control unit for multimedia devices. Typical multimedia devices include media players such as audio amplifiers, receivers, videocassette recorders (VCRs), compact disc (CD) players, digital versatile disc (DVD) players, audio equalizers, audio and video processing systems, etc. Since multimedia devices are manufactured by a variety of manufacturers, many features offered by the manufacturer of one type of media device are not included with the same type of device from a different manufacturer. Further, the same manufacturer of multiple models of the same type of media device does not always provide the same features and functions for all of those devices. Therefore, only a common denominator of functions exists in each of a single type of media device. For example, the common denominator for VCR devices includes the "play", "stop", "pause", "fast forward" and "rewind" functions. Other functions may or may not exist on any particular media device.

Existing user interfaces for managing multimedia devices with an information handling system are forced into only providing the common denominator functions for a given category of devices. As a result, these user interfaces cannot exploit the rich variety of features and functions included with many of the latest models of media devices, thereby limiting the usefulness of managing the multimedia devices with an information handling system. Thus, there lies a need for a user interface which is capable of providing control of all, or nearly all, of the available functions of multimedia devices beyond the common denominator functions of the category of media devices.

SUMMARY OF THE INVENTION

The present invention is directed to a system for generating a device user interface executable by an information handling system. In one embodiment, the system includes a processor for executing instructions on the information handling system and a memory coupled to the processor for storing instructions executed by the processor, a device database including a list of devices for which user interface components are available to implement functions for controlling the devices, a resource database including the user interface components, a user interface generator for determining whether the device is included in the device database and for retrieving the user interface components from the resource database, and a layout manager for assembling the user interface components retrieved by the user interface generator into a user interface executable by the information handling system to control the device.

The present invention is further directed to a method for generating a device user interface executable by an information handling system. In one embodiment, the method includes steps for identifying the device coupled to the information handling system to be controlled by the user interface, comparing the identified device to a database of devices for which user interface resource components are available for implementing the functions of the device and determining whether the device is listed in the database, in the event the device is not listed in the database, retrieving generic device user interface components for devices of the type of the identified device, otherwise, retrieving user interface components for implementing specific functions of the device, assembling the user interface components into a layout matrix, and creating the user interface from the layout matrix of the assembled user interface components It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
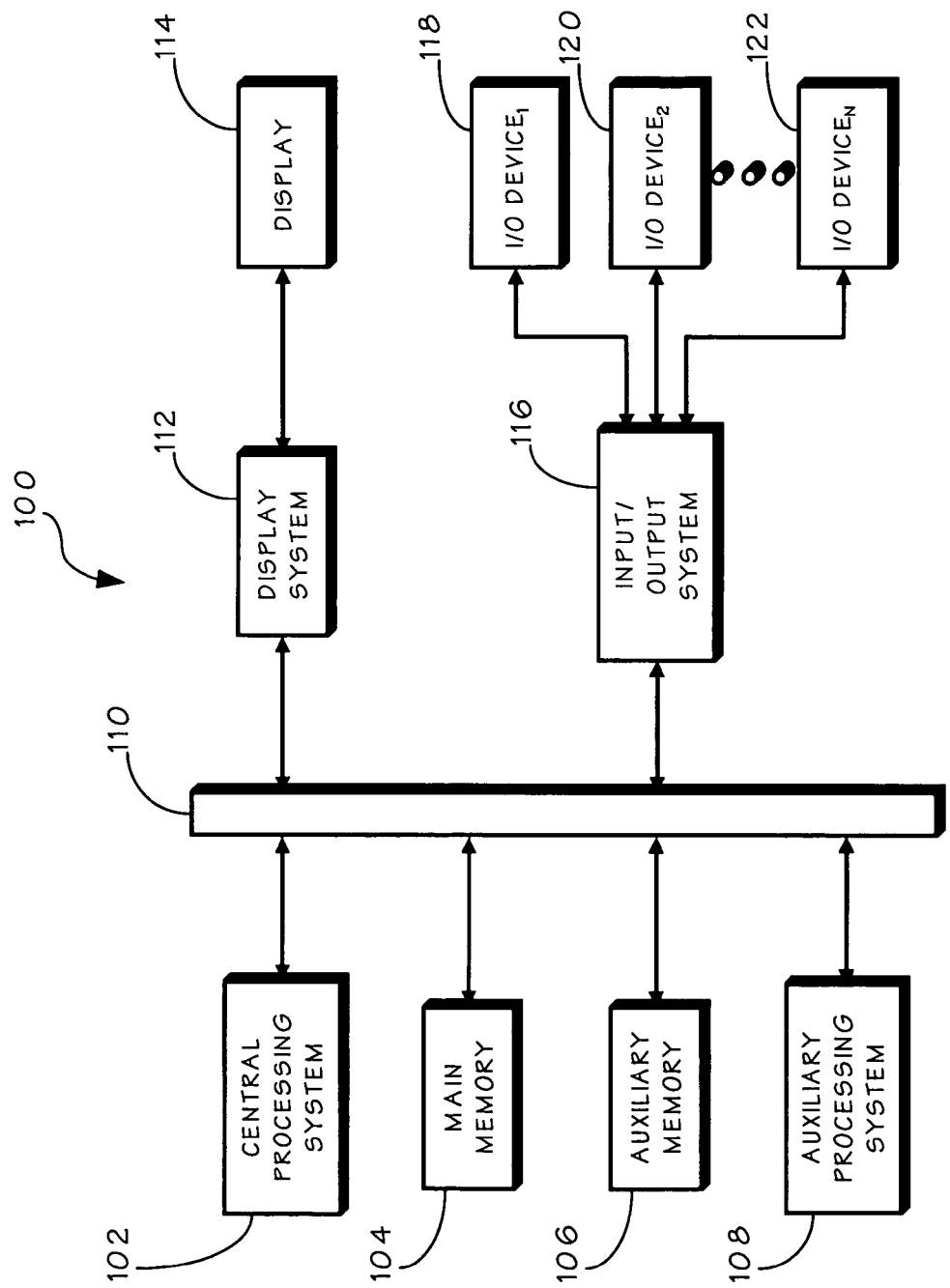
FIG. 1 is a block diagram of an information handling system operable to embody the present invention.

Referring now to FIG. 1, a hardware system of an information handling system in accordance with the present invention is shown. The hardware system shown in FIG. 1 is generally representative of the hardware architecture of an information handling system of the present invention. A central processing system 102 controls the information handling system 100. Central processing system 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processing system 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

Other components of information handling system 100 include main memory 104, auxiliary memory 106, and an auxiliary processing system 108 as required. Main memory 104 provides storage of instructions and data for programs executing on central processing system 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
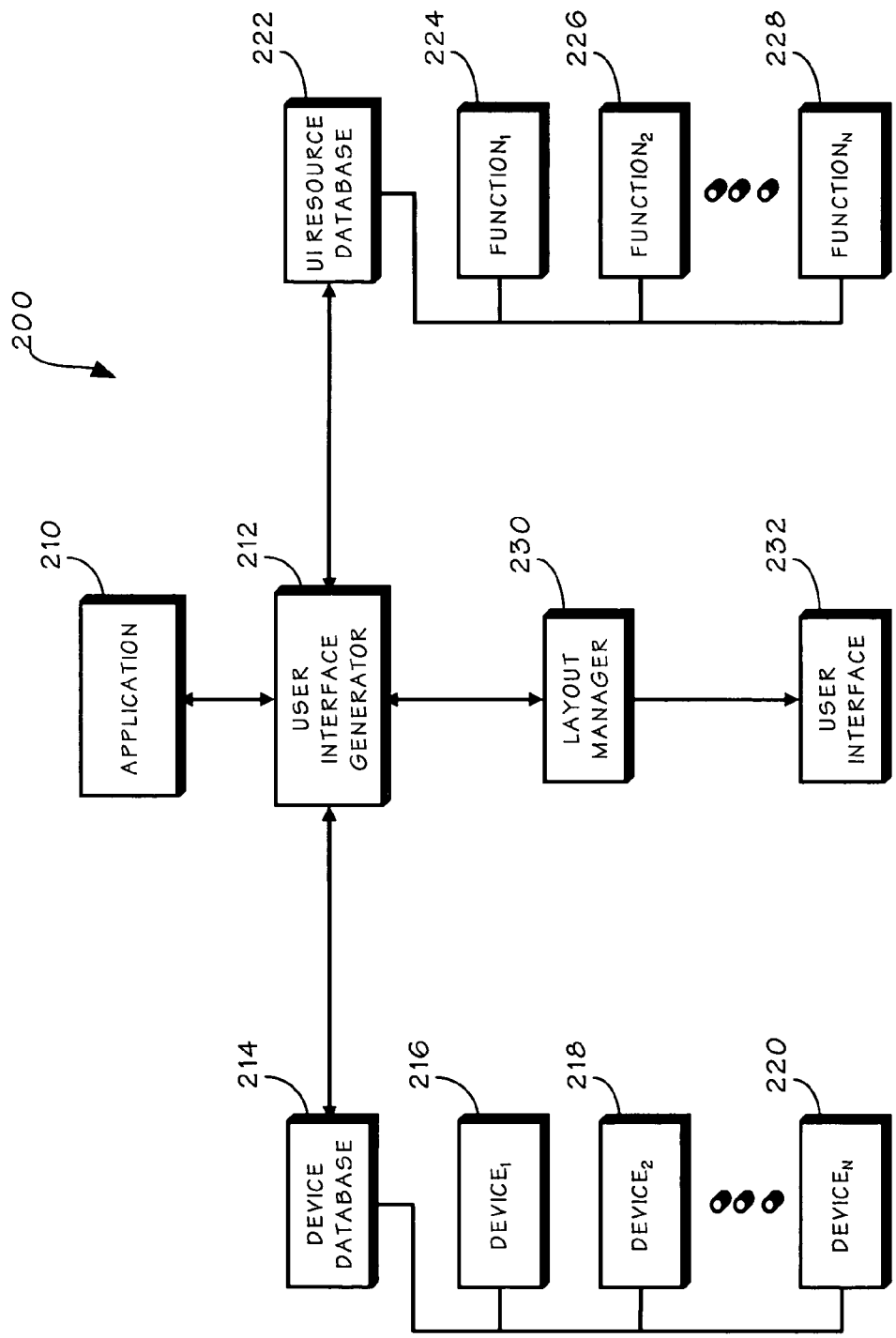
FIG. 2 is a block diagram of a system for automatically generating a user interface for a device of an information handling system in accordance with the present invention.

Referring now to FIG. 2, a system for automatically generating a user interface for a device of an information handling system in accordance with the present invention will be discussed. The system 200 represents the preferred embodiment in which an application 210 running on information handling system 100 is used to control a device connected to information handling system 100. The device may be an input device, output device, or an input/output (I/O) device 122 coupled to information handling system 100. Typically, device 122 is a multimedia device coupled to information handling system 100 such that control of device 122 may be provided by the information handling system. For example, a user of information handling system may utilize a remote input device such as a wireless mouse or keyboard, represented for example as I/O device 118, to enter a control command into information handling system in order to operate device 122. Device 122 may be a DVD player coupled to information handling system 100. The user may enter a "play" command with the input device in order to initiate the playback of a DVD disc disposed in the DVD player. Application 210 receives the command and controls the DVD player to initiate playback of the DVD disc. The user is allowed to select from the group of commands or functions that are available to control device 122 by application 210 that provides a user interface 232 for displaying the group of commands and for executing a selected command. Application 210 may be initiated, for example, when a new device is coupled to information handling system 100 or when device 122 is powered on such that an appropriate user interface 232 may be generated by user interface generator 212. Alternatively, a user may cause the initiation of application 210 by causing the application to be executed by information handling system 100 (e.g., via an input command). Upon initiation, application 210 calls user interface generator 212 to generate an appropriate user interface 232 for controlling device 122. User interface generator 212 accesses a device database 214 that contains a list of known devices 216–220. Device database 214 contains a list of devices 216–220 for which control functions beyond the common denominator of functions of classes of devices are known. For example, device database 214 may be a registry stored in an information storage medium (e.g., auxiliary memory 106) of information handling system 100 containing a list of devices coupled to information handling system 100 and all of the functions that devices 216–220 are capable of providing. Device database 214 may be automatically generated by a program of instructions (e.g., an operating system) executing on information handling system 100 without requiring user intervention, or may be generated or modified by the user. A user interface (UI) resource database 222 contains a list of available functions 224–228 that are known for devices 216–220 listed in device database 214 that are provided as modular user interface objects, including common denominator functions, for each of the functions provided by devices 216–220 stored in device database 214. One or more functions, both common denominator functions and unique functions, may be structured in the form of an object, a self contained data structure that includes data about the device and procedures or instructions for controlling or manipulating the device. Such objects are known in the art of object-oriented programming in which a data structure is defined by the type of data that it contains and by the types of operations that can be applied to the data structure. Objects are therefore modules that, once created, need not be changed or redefined when another object is created or defined. Object modules are thus easily combined into a larger program of instructions. Thus, a first object may provide data and instructions for common denominator functions for controlling a recording device (e.g., play, record). A second object may provide data and instructions for controlling a particular function for a recording device (e.g., video freeze frame). User interface generator 212 creates the objects as modular interfaces based upon device database 214 and stores the objects in UI resource database 222. User interface generator 212 may then retrieve the modular user interface objects from UI resource database 222 and combine the objects to form a complete user interface 232 for all, or nearly all, functions of devices 216 listed in device database.

For example, device 122 may be a particular make and model of videocassette recorder (VCR). Data about that particular make and model of the VCR may be stored in device database 214. Storage of a particular make and model of the VCR in device database 214 indicates that the control functions 224–228 of that particular make and model of VCR are stored in user interface resource database as user interface objects. The control functions include "play", "fast forward", "frame speed adjust", "stop", "rewind", "tape speed adjust", "pause", "frame advance", and "menus". A combination of user interface components is contained in UI resource database 222 from which a user interface may be created (see FIG. 4). For example, a first UI component may provide control of "play", "stop", "pause", "fast forward", "rewind", and "frame advance" functions. This first UI component provides the common denominator functions common to all VCR's in general. A second UI component may provide control of "frame speed" functions. This function may be provided only for certain models of VCRs, but not all. Similarly, a third UI component may provide control of "tape speed adjustment" functions, and a fourth UI component may provide "menu" control functions for a particular make and model of VCR. User interface generator 212 retrieves the UI components from UI resource database 222 combining the functions 224–228 provided by the retrieved UI components to correspond to the available control functions for the device as listed in device database 214. The retrieved UI components are sent to a layout manager 230 that assembles the UI components into a user interface 232 (see FIG. 4). User interface 232 provides user control of the combination of functions for the selected device, for example, PLAY, STOP, PAUSE, FF, REW, and FA buttons to receive input commands from the user to execute the corresponding functions. Further, resulting user interface 232 may include a frame speed slider, a tape speed selector, and set up menu items to provide the additional functions available for the selected device. The user may then operate the device by entering the proper input commands using a coordinate position input device (e.g., mouse). When application 210 is used to control a different device, user interface generator 212 generates a new user interface customized for that particular, different device.

Application 210, user interface generator 212, layout manager 230 and user interface 232 may be embodied as a software program executed by central processing system 102 of information handling system 100. Device database 214 and user interface resource database 222 are preferably stored in main memory 104 or auxiliary memory 106 of information handling system. As necessary, device database 214 and UI resource database 222 may be maintained or updated via an information storage medium coupled to information handling system 100 (e.g., floppy disk, CD-ROM, ROM device) wherein the information storage medium contains updated device and UI resource information and routines for functions 228 of devices 220. Further, device database 214 and UI resource database 222 may be updated via information downloaded into information handling system 100 from a remote device coupled to information handling system 100 via a network (e.g., the Internet) coupled to input/output system 116.

Figure 3:
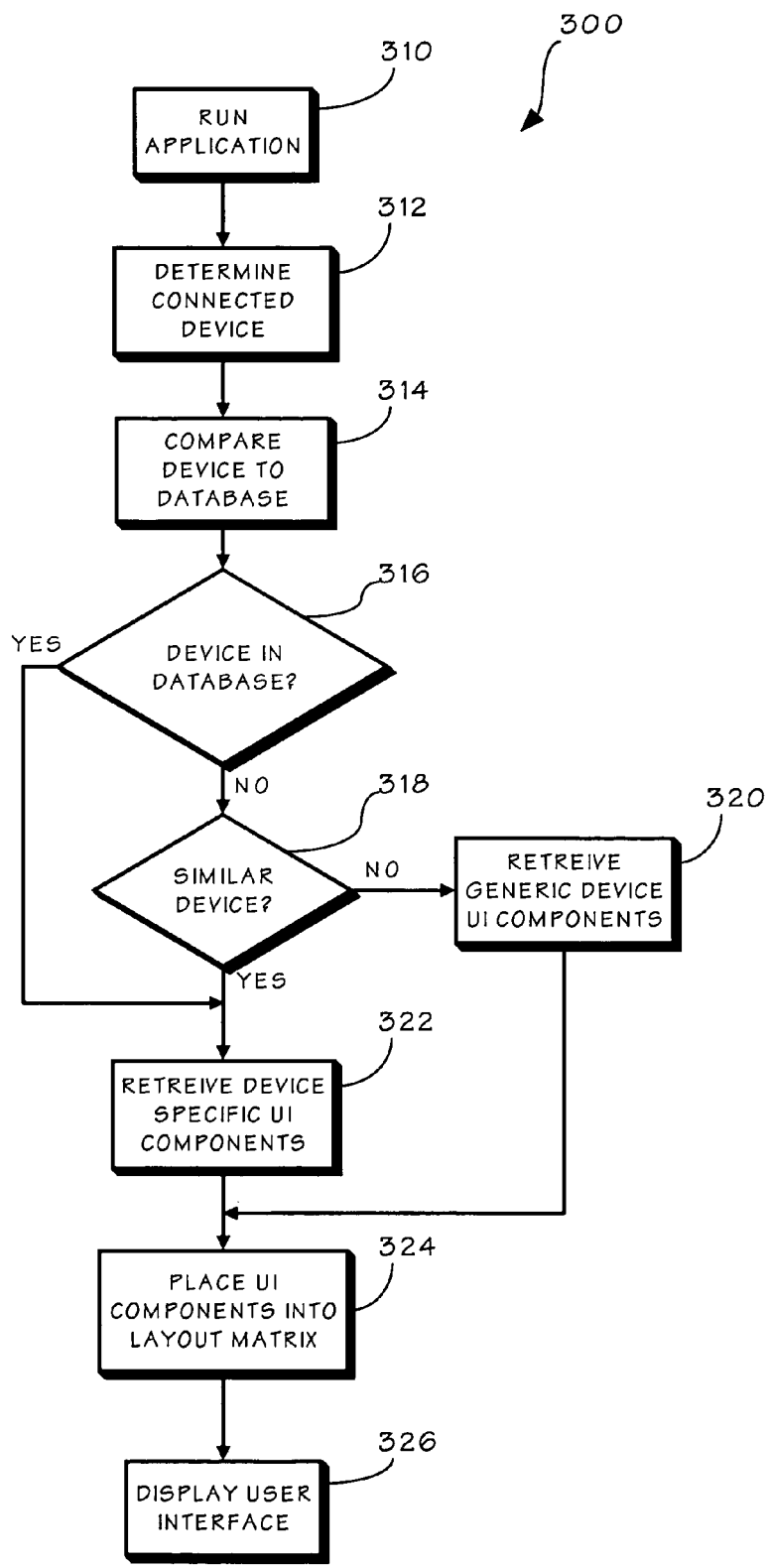
FIG. 3 is a flow diagram of a method for generating a device user interface in accordance with the present invention.

Referring now to FIG. 3, a flow diagram of a method for generating a device user interface in accordance with the present invention will be discussed. The method 300 initiates when an application is run at step 310 for controlling a device coupled to information handling system 100. The type of device, and the make and model of the device are determined at step 312. For example, the device name may be entered by a user or provided by the device itself e.g., from a ROM chip disposed in the device having data of the device type that is readable by information handling system 100. After determination of the device, the device is compared at step 314 to device database 214 for which functions of the device are known and for which user interface components are available to implement those functions in a user interface. A determination is made at step 316 whether the determined device is listed in database 214 of known devices. In the event the device is not listed in device database 214, a determination is made at step 318 whether the determined device is similar to a device listed in device database 214. For example, information handling system 100 may test the device to determine the type of functions that the device is capable of executing, or the user may enter what the device is generically (e.g., "VCR"). If a test for a VCR recording function is sent to the device and the device returns a signal indicating that the device is recording, then a determination may be made that the device is a VCR. Further, application 210 may determine, or the user may select, the closest device match in database by matching the device to the closest device already existing in database 214. In the event the device is not similar to a device listed in device database 214, generic device user interface components are retrieved at step 320 from user interface resource database 222. The retrieved generic device UI components provide those functions that are common to all devices of the determined type of device. Otherwise, the device specific UI components for implementing the functions of the determined device as listed in device database 214 are retrieved at step 322 from UI resource database 222. Layout manager 230 places the retrieved UI components into a layout matrix at step 324 and creates a user interface 232 at step 326 for implementing the functions available for the determined device. User interface 232 may be generated automatically without requiring any intervention by the user. Method 300 may be implemented as a program of instructions stored in main memory 104 or auxiliary memory 106 and executed by central processing system 102 or auxiliary processing system 108.

Figure 4:
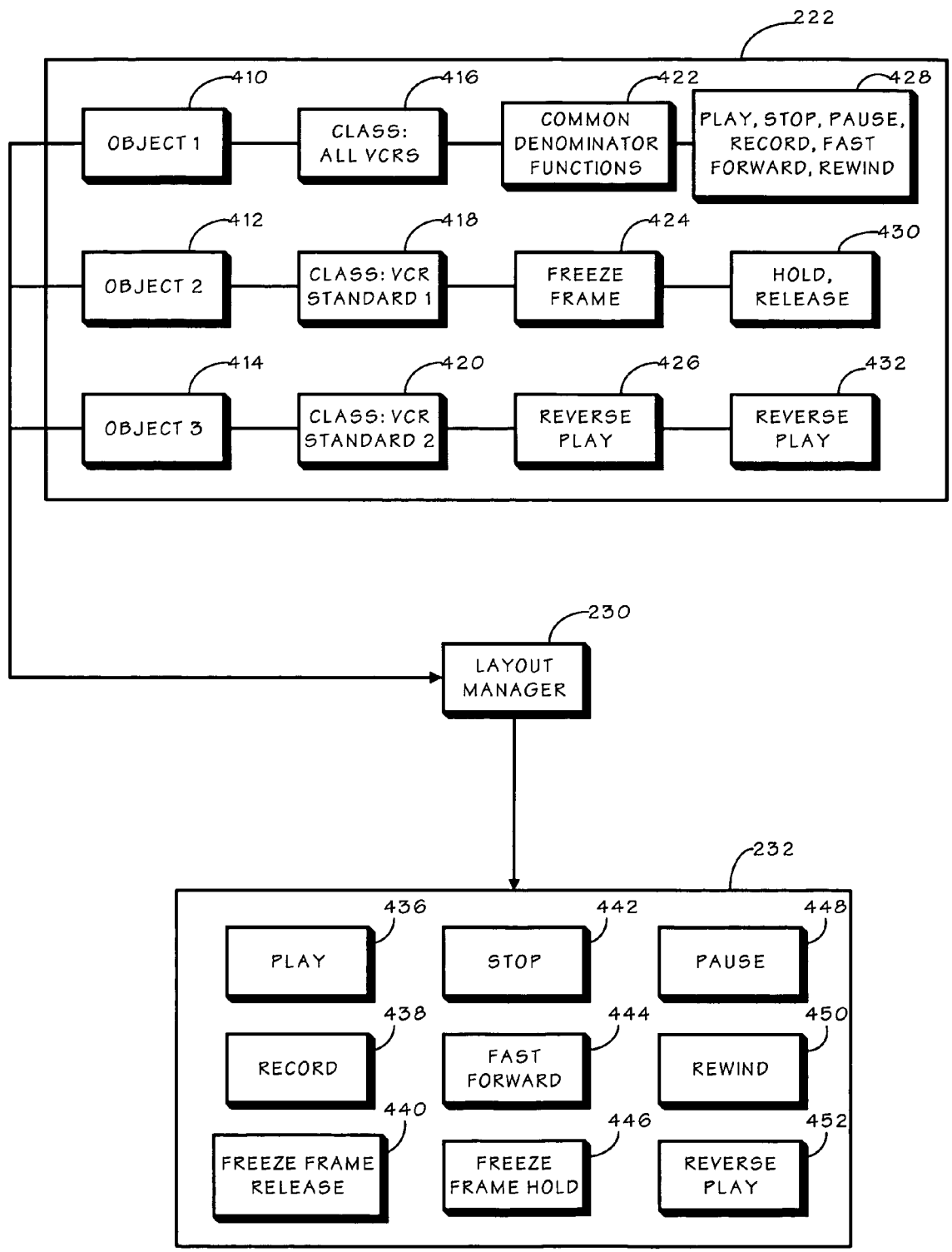
FIG. 4 is a block diagram of the assembly of a user interface from device function objects in accordance with the present invention.

Referring now to FIG. 4, a block diagram of the assembly of a user interface from device function objects in accordance with the present invention will be discussed. UI resource database 222 contains one or more objects that incorporate the functions 224–228 of devices 216–220. For example, a first object 410 may be defined for a first class of devices 416 such as all VCRs. Object 410 may contain data 422 for common denominator functions 422 as a common set of instructions for controlling the class of all VCRs. The common denominator functions 428 may include instructions for implementing play, stop, pause, record, fast forward, and rewind functions for all VCRs. A second object 412 may be defined for a second class of devices 418 such as VCRs compliant with a first standard. Such devices may provide freeze frame functions 424 that include instructions 430 for holding and releasing a video image. A third object 414 may be defined for a third class of devices 420 such as VCRs compliant with a second standard. Such devices may provide a reverse play function 428 that include instructions for causing a VCR of class 420 to reverse play a video signal. Layout manager 230 is called by user interface generator 212 for assembling a user interface 232 based upon available functions for a given device. The given device may be a VCR compliant with the first and second standards. User interface generator 212 passes objects 410, 412 and 414 to layout manager 230 that assembles a user interface for controlling the VCR based upon the VCR functions provided by objects 410, 412 and 414. For example, layout manager 230 may assemble user interface by assembling icons corresponding to the functions 428, 430 and 432 of objects 410, 412 and 414, respectively. As shown in FIG. 4, user interface 232 may include icons for implementing common denominator functions (play 436, stop 442, pause 448, record 438, fast forward 444, and rewind 450), for implementing freeze frame functions (freeze frame release 440, freeze frame hold 446) and for implementing a reverse play function (reverse play 452). When a user selects an icon of user interface 232, information handling system 100 executes the corresponding instruction and thereby controls the VCR by calling the object having the corresponding instruction.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for automatically generating a device user interface of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A system for generating a customized device user interface executable by an information handling system, comprising:
   a processor for executing instructions on the information handling system and a memory coupled to said processor for storing instructions for execution by said processor;
   a device database including listing available modular user interface components for implementing control functions of a device coupled to the information handling system;
   a resource database including the modular user interface components, wherein at least two of the modular user interface components are objects, wherein said objects include common denominator functions for controlling a device, said resource database being stored separately from the device database, the resource database being updated from at least one of a single information storage medium or a network;
   a user interface generator for determining whether the device is included in said device database and for retrieving the modular user interface components for that device from said resource database without requiring user intervention, wherein the user interface generator also combines the objects to form a complete user interface for all functions of the device; and
   a layout manager for automatically assembling the modular user interface components retrieved by said user interface generator into a user interface executable by the information handling system to control the device without intervention by the user.

2. A system as claimed in claim 1, wherein the device is a multimedia device controlled by the information handling system.

3. A system as claimed in claim 1, wherein said device database is created without requiring user intervention.

4. A system as claimed in claim 1, wherein said resource database is created without requiring user intervention.

5. A system as claimed in claim 1, wherein the user interface components of said resource database comprise a plurality of objects.

6. A system for generating a customized device user interface executable by an information handling system, comprising:
   means for executing instructions on the information handling system and means, coupled to said executing means, for storing instructions for execution by said processor;
   means for listing available means for implementing control functions of a device coupled to the information handling system, the implementing means being modular;

means for storing the modular implementing means, wherein at least two of the modular implementing means are objects, wherein said objects include common denominator functions for controlling a device, said storing means being separate from the listing means and said storing means being updated from at least one of a single information storage medium or a network;

means for combining the objects to form a complete user interface for all functions of the device;

means for determining whether the device is included in said listing means, and for retrieving the implementing means from said implementing means storage means, said determining means being capable of operating without user intervention; and means for automatically assembling the implementing means retrieved by said determining means into a user interface executable by the information handling system to control the device without user intervention.

7. A system as claimed in claim 6, wherein the device is a multimedia device controlled by the information handling system.

8. A system as claimed in claim 6, wherein said device list storing means is created without requiring user intervention.

9. A system as claimed in claim 6, wherein said implementing means storing means is created without requiring user intervention.

10. A system as claimed in claim 6, wherein the implementing means comprises a plurality of objects.

11. A computer implemented method for generating a customized device user interface for an information handling system, comprising:

identifying a device coupled to the information handling system to be controlled by the user interface;

comparing the identified device to a database of devices which includes a listing of modular user interface resource components available for implementing the functions of the device and determining whether the device is listed in the database of devices without user intervention, wherein at least two of the modular user interface resource components are objects, wherein said objects include common denominator functions for controlling a device;

combining the objects to form a complete user interface for all functions of the device;

retrieving the modular user interface components from a database of modular user interface components stored separately from the database of devices and updated from at least one of a single information storage medium or a network, the modular user interface components for implementing functions of the device; and creating the user interface from the modular user interface components automatically without user intervention.

12. A method as claimed in claim 11, further comprising the steps of, in the event the device is not listed in the database of devices, determining whether a similar device similar to the device is listed in the database of devices; in the event a similar device is not listed in the database of devices, executing a generic device user interface component retrieving step; otherwise, executing said device specific user interface components retrieving step.

13. A method as claimed in claim 11, further comprising the step of displaying the user interface on a display coupled to the information handling system such that a user may control the device with the user interface.

14. A method as claimed in claim 11, said creating step being implemented automatically.

15. A method as claimed in claim 11, the user interface resource components comprising a plurality of objects.

16. A computer implemented program of instructions stored on a computer readable medium and executable by an information handling system, the contents of the program of instructions causing an information handling system to execute steps for generating a customized device user interface for the information handling system, the steps comprising:

identifying the device coupled to the information handling system to be controlled by the user interface;

comparing the identified device to a database of devices which includes a listing of modular user interface resource components available for implementing the functions of the device and determining whether the device is listed in the database of devices without user intervention, wherein at least two of the modular user interface resource components are objects, wherein said objects includes common denominator functions for controlling a device;

combining the objects to form a complete user interface for all functions of the device;

retrieving the modular user interface components from a database of modular interface components stored separately from the database of devices and updated from at least one of a single information storage medium or a network, the modular user interface components for implementing functions of the device; and creating the user interface from the assembled user interface components without user intervention.

17. A program of instructions as claimed in claim 16, further comprising the steps of, in the event the device is not listed in the database of devices, determining whether a similar device similar to the device is listed in the database of devices; in the event a similar device is not listed in the database of devices, executing a generic device user interface component retrieving step; otherwise, executing said device specific user interface components retrieving step.

18. A program of instructions as claimed in claim 16, the steps further comprising the step of displaying the user interface on a display coupled to the information handling system such that a user may control the device with the user interface.

19. A program of instructions as claimed in claim 16, said assembling step being implemented automatically.

20. A program of instructions as claimed in claim 16, the user interface components comprising a plurality of discrete objects.

* * * * *